No. 868,808. PATENTED OCT. 22, 1907.
E. F. PRICE.
FURNACE.
APPLICATION FILED FEB. 1, 1907.

Witnesses:
Chas. H. Potter.
E. G. Fullam.

Inventor:
Edgar F. Price,
by Byrnes & Townsend
Att'ys.

UNITED STATES PATENT OFFICE.

EDGAR F. PRICE, OF NIAGARA FALLS, NEW YORK.

FURNACE.

No. 868,808.       Specification of Letters Patent.       Patented Oct. 22, 1907.

Application filed February 1, 1907. Serial No. 355,338.

*To all whom it may concern:*

Be it known that I, EDGAR F. PRICE, a citizen of the United States, residing at Niagara Falls, in the county of Niagara and State of New York, have invented certain new and useful Improvements in Furnaces, of which the following is a specification.

This invention is an improved means for supplying air and gaseous fuel to furnaces, especially the rotary drums employed for calcining ores and rock, so as to produce uniform or regulated combustion therein.

Figure 1:
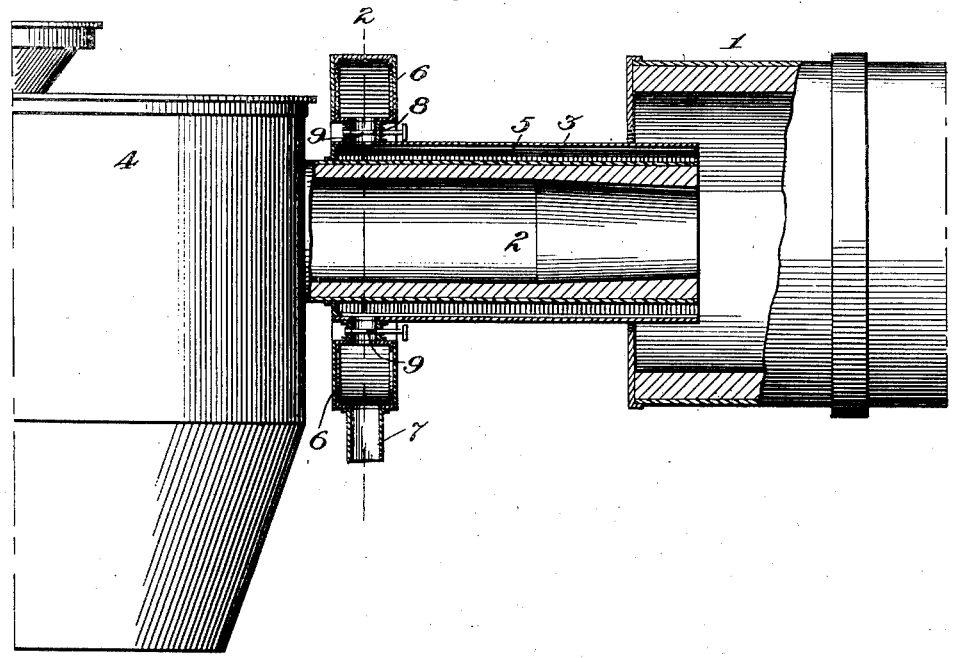
Figure 2:
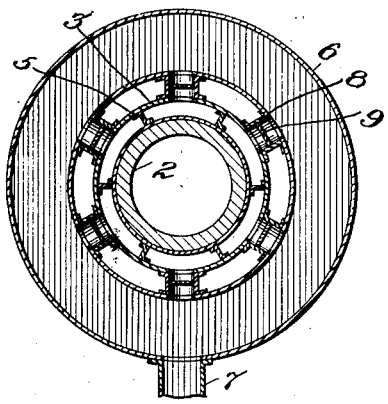

Referring to the accompanying drawings—Figure 1 is a side elevation, partly in section, of a portion of a rotary calcining drum, a gas-producer, and the improved means for supplying gas and air to the drum; Fig. 2 is a transverse vertical section on the line 2—2 of Fig. 1.

The heating chamber, shown in Fig. 1 as a rotary cylinder, is open at one end and receives the concentric gas and air flues 2, 3. The flue 2 is shown as receiving gas from a producer 4, but it may be supplied with gas from any source, or with oil or a blast of pulverized fuel. The annular air flue 3 is subdivided by longitudinal partitions 5. Around the outer end of the flue 3 is a bustle-pipe 6, receiving air from a blast-main 7. Supply ports 8 having control-valves or gates 9 open radially inward from the bustle-pipe into the air flue 3, at points circumferentially between the partitions 5. By adjusting these valves, the amount of air supplied to different portions of the drum may be regulated so as to produce uniform combustion therein, or, if desired, to increase the combustion and heat at any desired point.

I claim:

1. A furnace, comprising a heating chamber, concentric fuel and air flues opening into said chamber, and independently-valved supply ports opening into the outer flue at different points circumferentially.

2. A furnace, comprising a heating chamber, concentric fuel and air flues opening into said chamber, longitudinal partitions in the outer flue, and independently-valved supply ports severally opening into the outer flue at points circumferentially between the partitions.

3. A furnace, comprising a revoluble cylindrical heating chamber, concentric fuel and air flues opening into said chamber, and independently-valved supply ports opening into the outer flue at different points circumferentially.

4. A furnace, comprising a revoluble cylindrical heating chamber, concentric fuel and air flues opening into said chamber, longitudinal partitions in the outer flue, and valved supply ports severally opening into the outer flue at points circumferentially between the partitions.

5. A furnace, comprising a heating chamber, a gas producer, a gas flue connecting said producer and chamber, air flues arranged around said gas flue, and means for separately controlling each air flue.

6. A furnace, comprising a revoluble cylindrical heating chamber, a gas producer, a gas flue connecting said producer and chamber, air flues arranged around said gas flue, and means for separately controlling each air flue.

In testimony whereof, I affix my signature in presence of two witnesses.

EDGAR F. PRICE.

Witnesses:
    J. S. JACKSON,
    B. O'SHEA.